(12) United States Patent
Bailey, Jr. et al.

(10) Patent No.: US 8,515,927 B2
(45) Date of Patent: Aug. 20, 2013

(54) DETERMINING INDEXES FOR IMPROVING DATABASE SYSTEM PERFORMANCE

(75) Inventors: George E. Bailey, Jr., Houston, TX (US); Kurt V. Goolsbee, Spring, TX (US); Everett T. Miskelly, Houston, TX (US)

(73) Assignee: BBS Technologies, Inc., Houston, TX (US)

( * ) Notice: Subject to any disclaimer, the term of this patent is extended or adjusted under 35 U.S.C. 154(b) by 0 days.

(21) Appl. No.: 13/225,230

(22) Filed: Sep. 2, 2011

(65) Prior Publication Data

US 2013/0060782 A1    Mar. 7, 2013

(51) Int. Cl.
*G06F 17/30*    (2006.01)

(52) U.S. Cl.
USPC .......................................... 707/696; 707/741

(58) Field of Classification Search
USPC .................................. 707/696, 741
See application file for complete search history.

(56) References Cited

U.S. PATENT DOCUMENTS

| | | | | |
|---|---|---|---|---|
| 6,223,171 | B1 * | 4/2001 | Chaudhuri et al. | 707/718 |
| 7,158,996 | B2 * | 1/2007 | Croisettier et al. | 707/741 |
| 7,272,589 | B1 * | 9/2007 | Guay et al. | 707/716 |
| 7,289,990 | B2 * | 10/2007 | Gupta | 707/688 |
| 7,797,347 | B2 * | 9/2010 | Draese et al. | 707/796 |
| 7,805,434 | B2 * | 9/2010 | Alcorn et al. | 707/713 |
| 7,962,521 | B2 * | 6/2011 | Brown et al. | 707/791 |
| 7,974,969 | B1 * | 7/2011 | Balbirsky et al. | 707/713 |

* cited by examiner

*Primary Examiner* — Kim Nguyen
(74) *Attorney, Agent, or Firm* — Park, Vaughan, Fleming & Dowler, LLP; Laxman Sahasrabuddhe

(57) ABSTRACT

Methods and systems for identifying one or more indexes are described. A system can collect a set of database operations that were performed during a given time window. Next, the system can partition the set of database operations based on a set of database tables that were accessed by the set of database operations. Then, for each database table in the set of database tables, the system can determine a set of indexes that are candidates for improving database system performance. Next, based on the candidate indexes, the system can identify one or more indexes, one or more combinations of indexes, and/or a consolidated index that improve overall database system performance.

12 Claims, 2 Drawing Sheets

DETERMINING INDEXES FOR IMPROVING DATABASE SYSTEM PERFORMANCE

TECHNICAL FIELD

This disclosure relates to database systems. More specifically, this disclosure relates to determining indexes for improving database system performance.

BACKGROUND

Related Art

Database systems are used for many mission critical applications in modern enterprises. The size and complexity of databases has grown exponentially over the past several years. It is not uncommon for an enterprise to use terabyte- or petabyte-sized databases.

Given the size and complexity of modern databases, and the fact that they are commonly used in mission critical applications, it is not surprising that database system performance is often an important issue. Indexes can be used to improve database system performance. However, it can be very challenging to determine an optimal set of indexes for a database system.

SUMMARY

Some embodiments described herein provide methods and systems for identifying one or more indexes for improving database system performance. A database system can collect a set of database operations, e.g., those that were performed during a given time window. Next, the database system can partition the set of database operations based on a set of database tables that were accessed by the set of database operations. Then, for each database table in the set of database tables, the database system can perform the following operations: (1) determine a set of indexes that are candidates for improving database system performance; and (2) identify, based on the set of database operations that access the table, one or more indexes from the set of indexes that improve overall database system performance.

If only one index was identified, the database system can provide a recommendation to the user to add the index to the database table. On the other hand, if multiple indexes were identified, then the database system can: (1) generate a set of combinations based on the multiple indexes; and (2) identify, based on the set of database operations that access the table, one or more combinations from the set of combinations that improve overall database system performance.

If only one combination was identified, and if adding the combination of indexes improves database system performance more than adding one of the individual indexes, then the database system can provide a recommendation to the user to add the combination to the database table. On the other hand, if multiple combinations were identified, then the database system can: (1) determine a consolidated index based on the multiple combinations; and (2) determine, based on the set of database operations that access the table, whether or not the consolidated index improves overall database system performance.

If the consolidated index improves overall database system performance, and if this improvement is greater than the improvement that will be achieved by adding the combinations or by adding the individual indexes, then the database system can provide a recommendation to the user to add the consolidated index to the database table.

In some embodiments, the database system can determine, for a given table, a set of indexes, a set of combinations of indexes, and/or a set of consolidated indexes to improve overall database system performance. Next, the database system can select one or more indexes from the set of indexes, one or more combinations of indexes from the set of combinations of indexes, and/or one or more consolidated indexes from the set of consolidated indexes that result in the greatest improvement in database system performance.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
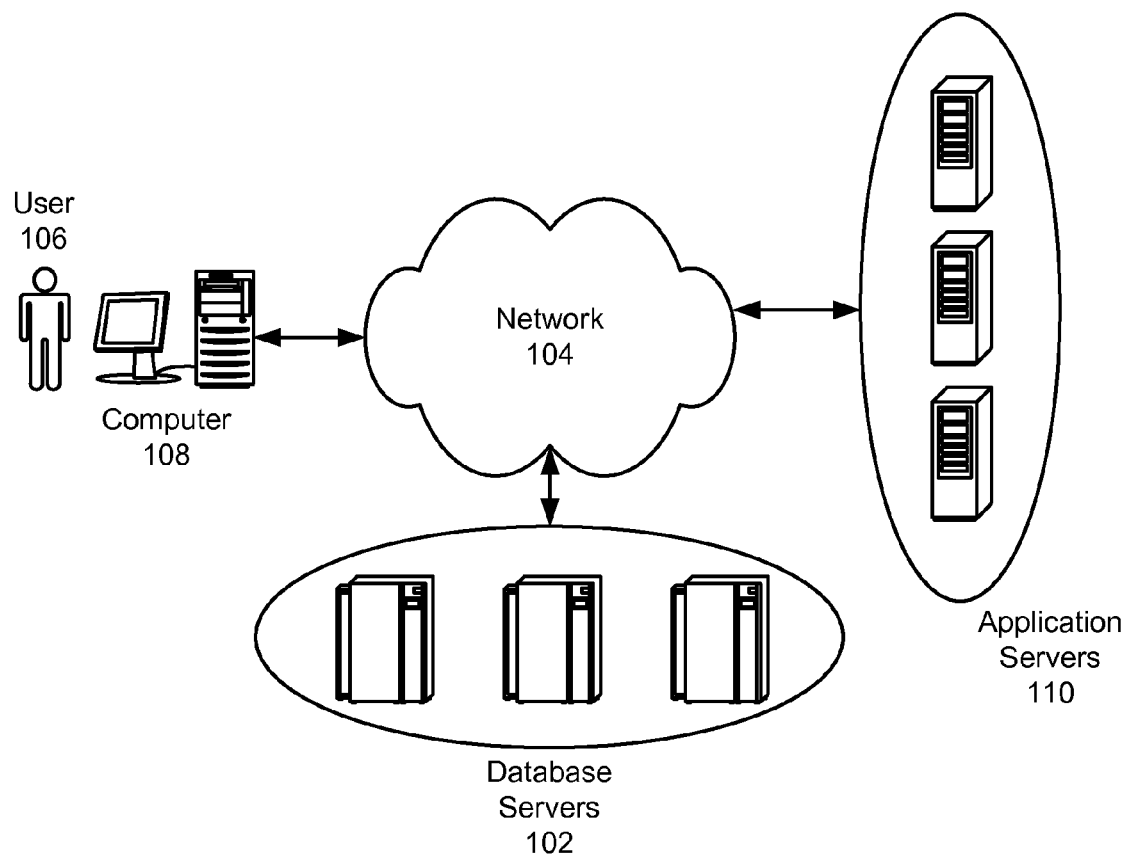
FIG. 1 illustrates a system in accordance with some embodiments described herein.

FIG. 1 illustrates a system in accordance with some embodiments described herein. The system shown in FIG. 1 includes a set of application servers 110, a set of database servers 102, user 106 at computer 108, and network 104. Computer 108, application servers 110, and database servers 102 can communicate with one another via network 104.

Network 104 can generally include any type of wired or wireless communication channel capable of coupling together computing nodes. This includes, but is not limited to, a local area network, a wide area network, or a combination of networks. In some configurations application servers 110 and database servers 102 can be located on the same physical device.

Database servers 102 can store data using a variety of data storage systems. This includes, but is not limited to, systems based upon magnetic, optical, and magneto-optical storage devices, as well as storage devices based on flash memory and/or battery-backed up memory.

User 106 can be a database administrator (DBA) who is responsible for the operation and maintenance of database servers 102, and typically has the privilege to modify data stored in the storage system.

According to one definition: (1) a database is an organized collection of data; (2) a database server is a computer program that executes on a computer system and provides access to one or more databases based on a client-server model; and (3) a database system comprises, among other things, one or more databases, one or more database servers, and one or more computer systems on which the one or more database servers execute.

Figure 2:
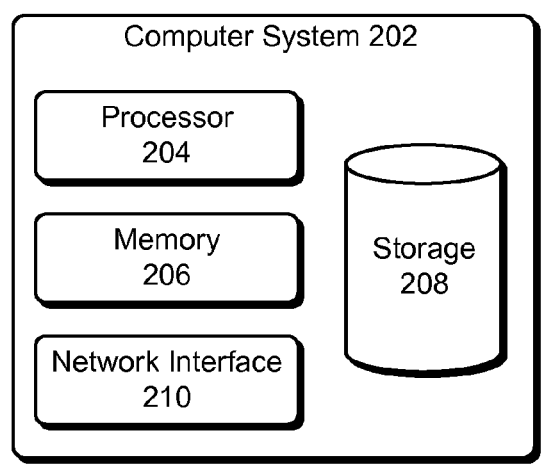
FIG. 2 illustrates a computer system in accordance with some embodiments described herein.

FIG. 2 illustrates a computer system in accordance with some embodiments described herein.

Computer system 202 can include processor 204, memory 206, storage 208 (e.g., flash or disk), and network interface 210. Computer system 202 can execute one or more instances of a database server. Specifically, storage 208 can include a database and instructions for a database server. The instructions for a database server can be loaded into memory 206 and executed by processor 204. During execution, the database server can receive requests to perform database operations from remote computers via network interface 210, and perform the requested database operations on the database stored in storage 208.

A database can be viewed as a collection of database tables. Each database table can include one or more columns and zero or more rows. Each column can have a unique name. A database query is an operation that enables a user and/or an application to retrieve data from one or more database tables that satisfy certain criteria.

The criteria for retrieving data can be specified using one or more query predicates. In particular, the set of one or more query predicates can specify logical and/or mathematical conditions over one or more column names. When the database system processes the database query, the database system can retrieve rows from one or more database tables such that the column values in the retrieved rows satisfy the set of query predicates.

For example, consider the following SQL (Structured Query Language) "SELECT" statement:

SELECT firstname, lastname, SSN, age FROM employee WHERE (lastname='Smith' AND age>65);

In the above SQL statement, "firstname," "lastname," "SSN," and "age" are column names, "employee" is a table name, and the expression "(lastname='Smith' AND age>65)" is a predicate. When the database system processes this query, it will return all rows in table "employee" in which the "lastname" column contains the name "Smith" and the "age" column contains a value that is greater than "65."

An index can substantially speed up database lookup operations. In the above example, absent an index, the database system would have to scan each row in table "employee" to find rows that match the predicate shown above. Note that a query can make use of an index only if the index has the right set of columns. In the above example, the database system would still have to scan table "employee" if the table only had an index on column "SSN." On the other hand, if table "employee" had an index on column "lastname," then the database system could have used the index to substantially increase the performance for the database query shown above.

An index can be defined on one or more columns. The space required to store an index is typically much less than that required to store the table. This is because the index usually includes data from a small subset of the columns. An index can also be defined on functions or expressions of one or more columns. In the example shown above, an index could be created on "upper(lastname)," which would only store the upper case versions of the "lastname" column in the index.

Database indexes do not come for free though. The index takes up disk space, and at least a portion of an index is often stored in physical memory for performance reasons; therefore, adding more indexes usually increases the memory usage of the database server. Furthermore, since the index needs to be updated whenever an INSERT, UPDATE, or DELETE operation is performed on a database table, adding an index can decrease the performance for these operations. Therefore, adding more indexes can end up degrading (instead of improving) the overall database system performance.

Some embodiments described herein generate recommendations for creating indexes to improve database system performance. In some embodiments, these recommendations are generated based on trace data that is collected in the database system.

A trace refers to a hardware and/or software mechanism that enables the database system to collect execution and/or performance data. In some embodiments described herein, the database system collects trace data for all database operations that are performed by a database server. The type and amount of trace data that is collected per database operation can depend on configuration settings that may be user configurable.

Specifically, in some embodiments, the database system may collect trace data that allows the database system to replay the sequence of database operations that were performed during a given time window. In other embodiments, the database system may store trace data that indicates how many times a particular database operation was performed during a given time period. For example, the database system may keep track of the number of times the "SELECT" database query shown above was performed. In these embodiments, the system may consider two database operations to be the same if the two database operations result in exactly the same execution plan. Some embodiments described herein can use these statistics to determine whether or not creating a new index is expected to improve the overall performance of the database system.

The software application or module that analyzes the trace data can be co-located with the database server or reside on a different computer system. For example, the trace data that is collected on one or more database servers 102 shown in FIG. 1 can be sent to computer 108. An application executing on computer 108 can, with or without user intervention, analyze the trace data and provide recommendations to create one or more indexes to improve database system performance.

Figure 3:
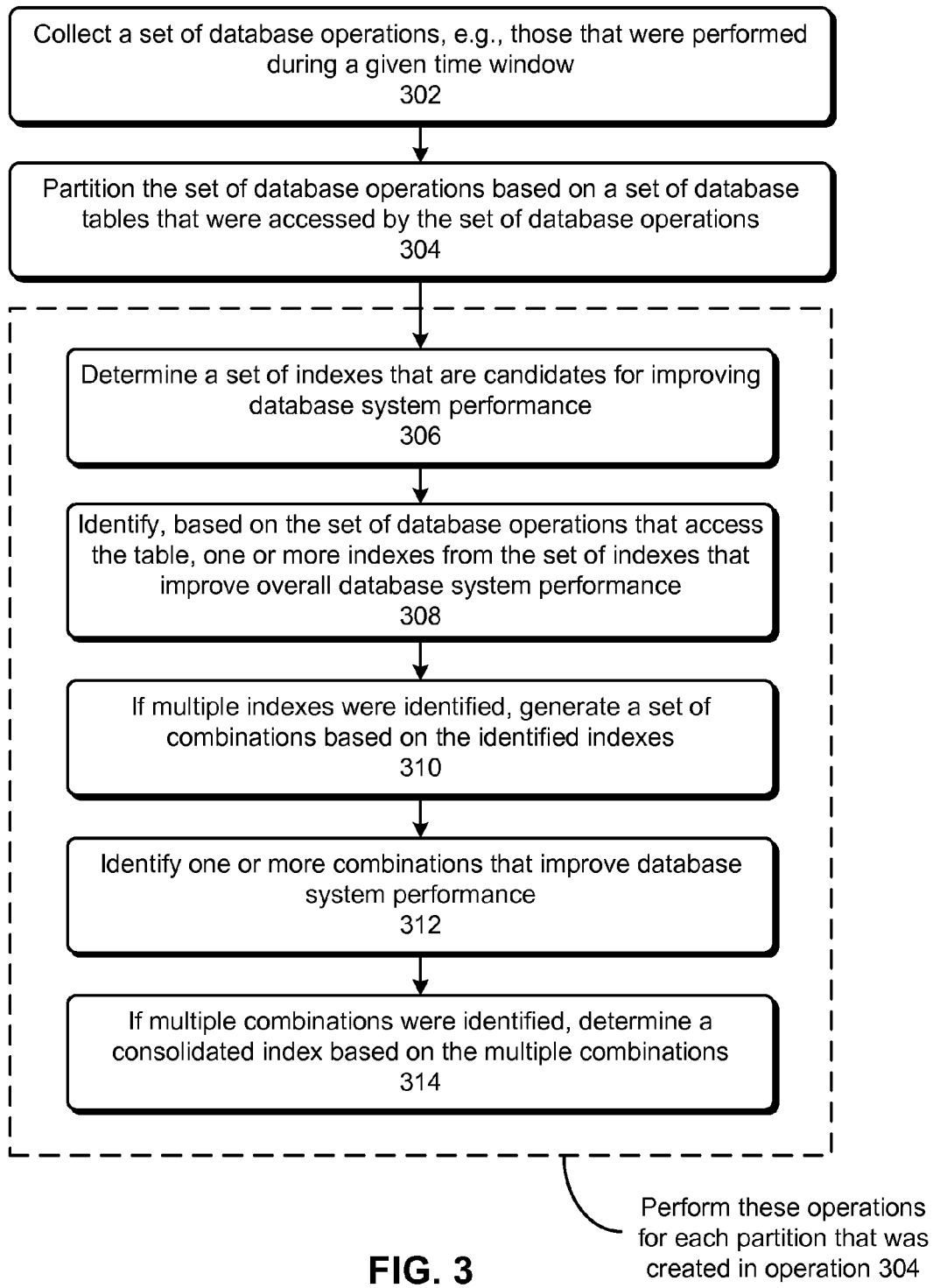
FIG. 3 presents a flowchart that illustrates a process for determining indexes to improve database system performance in accordance with some embodiments described herein.

FIG. 3 presents a flowchart that illustrates a process for determining indexes to improve database system performance in accordance with some embodiments described herein.

The process can begin with a database system collecting a set of database operations, e.g., those that were performed during a given time window (operation 302). Note that the collected database operations include more than just queries, e.g., the database operations can include all "SELECT," "UPDATE," "INSERT," and "DELETE" operations. Collecting all types of database operations (as opposed to collecting only database queries) is important because it allows the system to determine the overall impact that adding an index has on database system performance. The size of the time window can be suitably chosen so that the collected database operations accurately represent the typical workload of the database server.

If the database server experiences large variations in its workload, then the database system can collect data over multiple time windows, each time window representing a particular workload profile. For example, suppose the database server has very different workloads during the day and during the night. Then, the database system may collect data at two different time windows—one that represents the workload during the day and one that represents the workload during the night.

Next, the system can partition the set of database operations based on a set of database tables that were accessed by the set of database operations (operation 304). In other words, the system creates a partition for each database table that is accessed by one or more database operations, and places these database operations in the partition. For example, suppose database operation X1 accesses tables T1 and T2, database operation X2 accesses tables T2 and T3, and database operation X3 accesses table T1. In this example, the system will create three partitions P1, P2, and P3 corresponding to the three tables T1, T2, and T3, respectively. Partition P1 will include database operations X1 and X3, partition P2 will include database operations X1 and X2, and partition P3 will include database operation X2.

Then, for each database table in the set of database tables, the system can perform a set of operations to identify indexes that improve overall performance of database operations that operate on that database table.

Specifically, the system can determine a set of indexes that are candidates for improving database system performance (operation 306). The system can use a number of techniques for identifying candidate indexes. Some database servers identify missing indexes when they create a query execution plan for a database query. For example, when the database server creates a query execution plan, the database server can identify a "missing index" whenever the database server needs to perform a table scan. The system can use the missing indexes as the set of candidate indexes. Alternatively, or in addition to the missing indexes, the system can analyze the predicates in the database operations to determine candidate indexes. Specifically, if a particular column or a particular set of columns appear in one or more database queries, the system can flag those columns as good candidates for creating an index.

Next, the system can identify, based on the set of database operations that access the table, one or more indexes from the set of indexes that improve overall database system performance (operation 308). As mentioned before, adding an index does not always improve database system performance. Therefore, in operation 308, the system uses all of the database operations (as opposed to only database queries) in a partition to determine whether or not adding an index improves database system performance.

For example, suppose that operation X1 in the above-described example is a database query (e.g., a "SELECT" operation), and operation X3 is an operation that modifies the table (e.g., an "INSERT," "MODIFY," or "DELETE" operation). In this case, the system can determine indexes based on the query execution plan for X1 and/or the predicates for X1. However, when the system determines the overall impact of adding an index, it considers the impact of the index on the performance of operations X1 and X3 (as opposed to only considering operation X1).

Specifically, in some embodiments, the system can determine the estimated cost of all queries operating on each table using the execution plan of the query. The product of the estimated cost per query execution and the number of times the query is executed within the workload can then be used to determine the total cost contribution of the query. The performance impact on the database system can be determined by summing up the cost contributions of each unique query in a partition.

If multiple indexes were identified, the system can generate a set of combinations based on the identified indexes (operation 310). Otherwise, if only one index was identified, the system can recommend that the user add the identified index to the database table. A combination is a subset of the identified indexes. For example, suppose indexes I1, I2, and I3 are identified as indexes which, if added individually, would improve database system performance. Then the following is a list of all possible combinations in this case: {I1, I2}, {I1, I3}, {I2, I3}, and {I1, I2, I3}.

Note that a combination of two or more indexes may not improve database system performance as much as each of the indexes when used individually. For example, using both indexes I1 and I2 (i.e., using the combination {I1, I2}) may be worse—in terms of database system performance—than using only I1 or only I2.

Next, the system can identify one or more combinations that improve database system performance (operation 312). In some embodiments, a combination is selected in operation 312 only if it improves performance more than the individual indexes that were identified in operation 308.

If multiple combinations are identified in operation 312, then the system can determine a consolidated index based on the multiple combinations (operation 314). A consolidated index is an index that is defined over the union of all the columns that are used in the combinations. For example, suppose index I1 is defined over columns C1 and C2 of table T1, index I2 is defined over columns C2 and C3 of table T1, and index I3 is defined over columns C1 and C3 of table T1. Then a consolidated index based on the combinations {I1, I2} and {I1, I3} will be defined over columns C1, C2, and C3.

If the consolidated index improves database system performance at least as much as the underlying combinations or the underlying individual indexes, then the system can recommend that the user add the consolidated index to the database table. On the other hand, if the consolidated index does not perform as well as the underlying combinations or the underlying individual indexes, the system can recommend that the user add either the combinations or the individual indexes to the database table.

In some embodiments, the system can determine, for a given table, a set of indexes, a set of combinations of indexes, and/or a set of consolidated indexes to improve overall database system performance. Next, the system can select one or more indexes from the set of indexes, one or more combinations of indexes from the set of combinations of indexes, and/or one or more consolidated indexes from the set of consolidated indexes that result in the greatest improvement in database system performance.

In some embodiments, the system can provide the user, via a graphical user interface (GUI), with a list of indexes, combinations of indexes, and any consolidated indexes that were determined as improving database system performance. The list can also indicate the expected performance improvement for each item in the list. The user can then select, via the GUI, a recommendation from the list, and the database system can then create the appropriate indexes. In some embodiments, the system can rank the various recommendations based on the performance improvement that is expected to result from each of the recommendations. In some embodiments, the system can select only the top N recommendations (where N is a predetermined number) based on this ranking, and only present this truncated list to the user.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A method for identifying one or more indexes for improving database system performance, the method comprising:
    collecting a set of database operations that were performed during a given time window;
    partitioning the set of database operations into partitions based on a set of database tables that were accessed by the set of database operations, wherein each partition includes database operations that accessed a given table; and
    for each partition, performing the following set of operations:
        determining a set of indexes that are candidates for improving database system performance;
        identifying, based on the set of database operations in the partition, one or more indexes from the set of indexes that improve overall database system performance;
        in response to determining that the set of indexes includes only one index, providing a recommendation to the user to add the index to the database table;
        determining a consolidated index based on a set of combinations of indexes if multiple combinations of indexes were identified as improving overall database system performance; and
        determining, based on the set of database operations that access the table, whether or not the consolidated index improves overall database system performance.

2. The method of claim 1, wherein the set of operations further includes:
    generating the set of combinations based on multiple indexes if multiple indexes were identified as improving overall database system performance; and
    identifying, based on the set of database operations that access the table, one or more combinations from the set of combinations that improve overall database system performance.

3. The method of claim 1, wherein the set of operations further includes:
    in response to determining that only one combination from the set of combinations improves overall database system performance, providing a recommendation to the user to add the combination to the database table.

4. The method of claim 1, wherein the set of operations further includes:
    in response to determining that the consolidated index improves overall database system performance, providing a recommendation to the user to add the consolidated index to the database table.

5. A non-transitory computer-readable storage medium storing instructions that, when executed by a computer, cause the computer to perform a method for identifying one or more indexes for improving database system performance, the method comprising:
    collecting a set of database operations that were performed during a given time window;
    partitioning the set of database operations into partitions based on a set of database tables that were accessed by the set of database operations, wherein each partition includes database operations that accessed a given table; and
    for each partition, performing the following set of operations:
        determining a set of indexes that are candidates for improving database system performance;
        identifying, based on the set of database operations in the partition, one or more indexes from the set of indexes that improve overall database system performance;
        in response to determining that the set of indexes includes only one index, providing a recommendation to the user to add the index to the database table;
        determining a consolidated index based on a set of combinations of indexes if multiple combinations of indexes were identified as improving overall database system performance; and
        determining, based on the set of database operations that access the table, whether or not the consolidated index improves overall database system performance.

6. The non-transitory computer-readable storage medium of claim 5, wherein the set of operations further includes:
    generating the set of combinations based on multiple indexes if multiple indexes were identified as improving overall database system performance; and
    identifying, based on the set of database operations that access the table, one or more combinations from the set of combinations that improve overall database system performance.

7. The non-transitory computer-readable storage medium of claim 5, wherein the set of operations further includes:
    in response to determining that only one combination from the set of combinations improves overall database system performance, providing a recommendation to the user to add the combination to the database table.

8. The non-transitory computer-readable storage medium of claim 5, wherein the set of operations further includes:
    in response to determining that the consolidated index improves overall database system performance, providing a recommendation to the user to add the consolidated index to the database table.

9. A system, comprising:
    a processor; and
    a non-transitory storage medium storing instructions that, when executed by the processor, cause the system to perform a method for identifying one or more indexes for improving database system performance, the method comprising:
        collecting a set of database operations that were performed during a given time window;

partitioning the set of database operations into partitions based on a set of database tables that were accessed by the set of database operations, wherein each partition includes database operations that accessed a given table; and for each partition, performing the following set of operations:

determining a set of indexes that are candidates for improving database system performance;

identifying, based on the set of database operations in the partition, one or more indexes from the set of indexes that improve overall database system performance;

in response to determining that the set of indexes includes only one index, providing a recommendation to the user to add the index to the database table;

determining a consolidated index based on a set of combinations of indexes if multiple combinations of indexes were identified as improving overall database system performance; and determining, based on the set of database operations that access the table, whether or not the consolidated index improves overall database system performance.

10. The system of claim 9, wherein the set of operations further includes:

generating the set of combinations based on multiple indexes if multiple indexes were identified as improving overall database system performance; and identifying, based on the set of database operations that access the table, one or more combinations from the set of combinations that improve overall database system performance.

11. The system of claim 9, wherein the set of operations further includes:

in response to determining that only one combination from the set of combinations improves overall database system performance, providing a recommendation to the user to add the combination to the database table.

12. The system of claim 9, wherein the set of operations further includes:

in response to determining that the consolidated index improves overall database system performance, providing a recommendation to the user to add the consolidated index to the database table.

* * * * *